United States Patent [19]

Unterborn et al.

[11] Patent Number: 5,074,613

[45] Date of Patent: Dec. 24, 1991

[54] VEHICLE WINDSHIELD WIPER SYSTEM WITH IMPROVED HOUSING TO FRAME CONNECTION

[75] Inventors: Ralph J. Unterborn, Dayton; Harry C. Buchanan, Jr., Spring Valley, both of Ohio

[73] Assignee: General Motors Corporation, Detroit, Mich.

[21] Appl. No.: 444,650

[22] Filed: Dec. 1, 1989

[51] Int. Cl.⁵ .......................... B62D 25/08; B60S 1/18
[52] U.S. Cl. .................................. 296/192; 15/250.31
[58] Field of Search ...................... 296/192; 15/250.30, 15/250.31

[56] References Cited

U.S. PATENT DOCUMENTS

| | | | |
|---|---|---|---|
| 3,788,681 | 1/1974 | Barenyi et al. | 296/192 |
| 3,874,249 | 4/1975 | Carpenter | 74/606 |
| 4,718,712 | 1/1988 | Nakatani | 296/192 |
| 4,938,526 | 7/1990 | Sannomiya et al. | 296/192 |
| 4,943,102 | 7/1990 | Hamamoto et al. | 296/192 |

FOREIGN PATENT DOCUMENTS 89030779 2/1989 United Kingdom .

*Primary Examiner*—Robert R. Song
*Attorney, Agent, or Firm*—Patrick M. Griffin

[57] ABSTRACT

In a vehicle wiper system of the type having a frame tube fixed to the vehicle body, an improved mounting of a housing to the frame tube includes an inwardly tapered cradle portion on the housing that matches an inwardly tapered mounting portion of the tube, with deformable ribs on the housing cradle that are sheared by the tube when the housing is attached so as to assure solid, intimate contact between the housing and tube.

3 Claims, 2 Drawing Sheets

VEHICLE WINDSHIELD WIPER SYSTEM WITH IMPROVED HOUSING TO FRAME CONNECTION

This invention relates to vehicle windshield wiper systems in general, and specifically to a system of the kind that has a tube type frame to which various housings are mounted.

BACKGROUND OF THE INVENTION

A type of wiper system finding increasing acceptance includes an elongated steel tube fixed to the vehicle body below the windshield, which serves as the foundation or frame to which other components may be mounted. Amongst these components are various housings, such as the housing for the drive motor or the pivot housings for the wiper shafts. Conventionally, the motor housing is fixed to a separate bracket that is welded to the frame tube. Such a bracket provides a relatively large and flat surface to which the motor housing can be securely bolted. However, the bracket does represent an additional component, which inevitably adds cost. In addition, the high forces experienced in wiper systems, especially those with long wipers and heavy motors, require a very strong weld of bracket tube to prevent fatigue that could result from the overhung load. A direct connection of housing to frame tube could eliminate components and manufacturing steps. However, there is no immediately obvious way of securely fixing a housing, like the motor housing, to a tube of round cross section.

SUMMARY OF THE INVENTION

The invention provides a means for directly and securely mounting a housing to the frame tube. This is done in a way that assures intimate contact at the interface of the tube and housing, compensating for any manufacturing tolerances between the two.

In the preferred embodiment disclosed, an elongated frame tube of a relatively harder metal, such as steel, is adapted to be fixed to the vehicle body running below the windshield. Near the center of the tube, a mounting portion is stamped into a generally trapezoidal shape, with top and bottom walls joined by inwardly tapered side walls. The cross section of the mounting portion, as measured normal to the frame tube axis, is held as constant as is possible within the limitations of the stamping process, but there are some inevitable manufacturing tolerances.

A drive motor is molded of a relatively softer material, such as aluminum. The housing is molded with an integral channel portion, comprised of two pairs of opposed, inwardly tapered, flanges. The cross sectional area defined by the opposed flanges generally matches that of the frame tube mounting portion. However, localized projections in the form of thin ribs integrally molded with the flange surfaces project into that cross sectional area. Since the thin ribs are molded of the same softer material, they are deformable, if contacted under force by a harder material. The mounting means of the invention is completed by a pair of fastening bolts that pass through aligned holes in the top and bottom walls of the frame tube and thread into the housing.

To mount the housing to the frame tube, the bolt holes are aligned and the bolts threaded in to pull the frame tube between the opposed housing flanges. Given the matching cross sections of the frame tube and the housing flanges, the harder side walls of the tube will shear and deform the thin ribs as it is drawn into place. The ribs are large enough to assure that they will be deformed to an extent, regardless of any manufacturing tolerances in the housing flanges and frame tube side walls. Thus, solid, intimate contact between the tube and housing is assured. Adding to the security of the connection are wedging portions near the top of each bolt which tightly enter the bolt holes in the tube top wall to bias the side walls out and into the housing flanges.

It is, therefore, a general object of the invention, in a wiper system of the type having a body mounted frame tube, to provide a more secure and stable mounting of a housing to the tube.

It is another object of the invention to provide such an improved mounting through the cooperation of an inwardly tapered mounting portion on the frame tube of a harder material that is bolted into an inwardly tapered cradle portion of matching cross section on the housing, with deformable projections of a softer material on the housing mounting portion that extend out far enough to be assured of being deformed, in turn assuring intimate contact and a secure and stable connection.

It is still another object of the invention to provide such an inwardly tapered mounting portion on a frame tube with an upper wall and a pair of spaced side walls, and to provide the fastening bolt with a wedging portion that enters the upper wall and biases the side walls apart and into the housing to increase the solidity of the connection.

DESCRIPTION OF THE PREFERRED EMBODIMENT

These and other objects and features of the invention will appear from the following written description, and from the drawings, in which.

Figure 1:
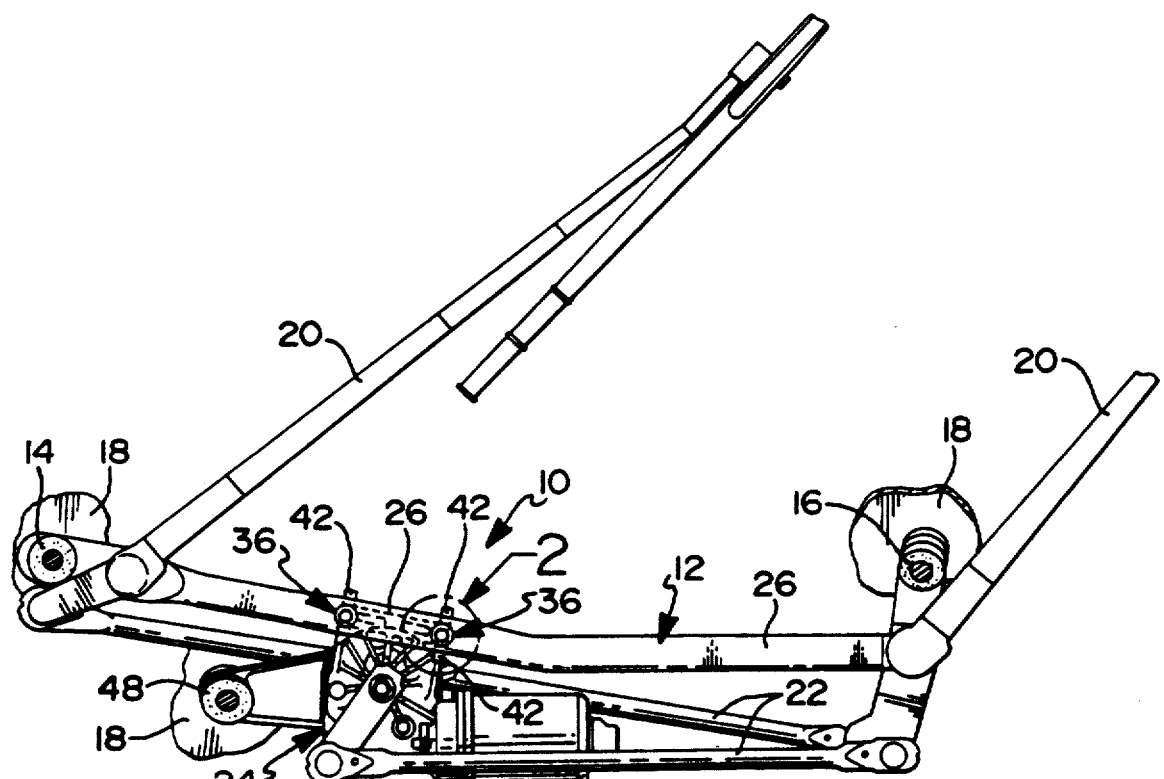
FIG. 1 is a plan view of a vehicle wiper system incorporating the improved mounting of the invention.
Figure 2:
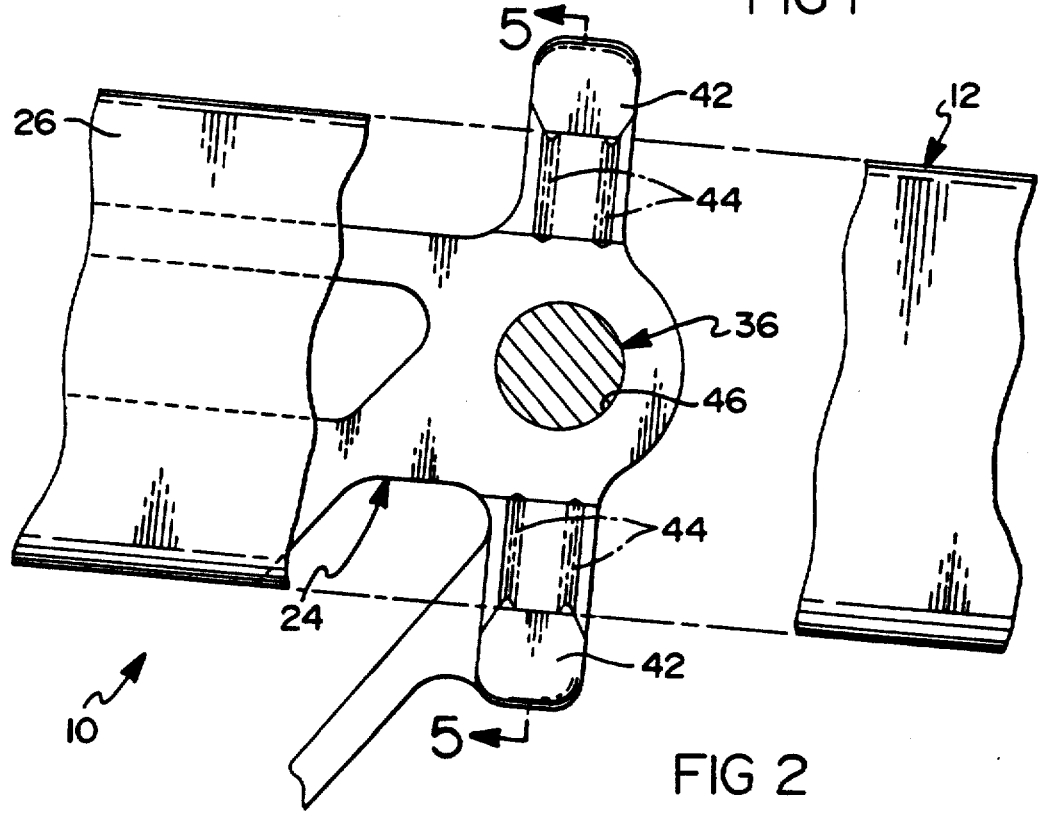
FIG. 2 is an enlarged view of the circled portion of FIG. 1, with part of the frame tube broken away to reveal the housing below.

Referring first to FIGS. 1 and 2, a vehicle wiper system incorporating a preferred embodiment of the invention is indicated generally at 10. System 10 is built on a tube frame, indicated generally at 12, which is formed from a length of round steel tubing that is bent and stamped into the various shapes desired. Tube 12 has fastening grommets 14 and 16 at the ends that are adapted to be fixed to a vehicle body, portions of which are indicated at 18. Tube 12 is thereby located below and generally parallel to the lower edge of windshield, not shown, and can serve as the foundation to which other components may be attached. Amongst the other components are a pair of wipers 20, a drive linkage 22, and a drive motor housing, indicated generally at 24. The invention is illustrated specifically with regard to the way the drive motor housing 24 is mounted to tube 12.

Figure 3:
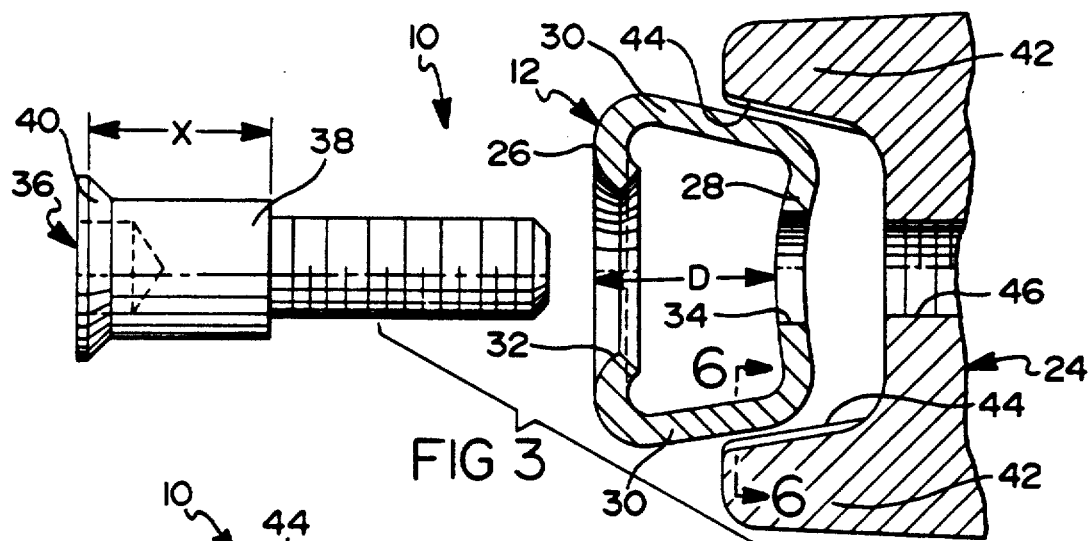
FIG. 3 is a view like FIG. 5, but showing the parts before attachment.
Figure 4:
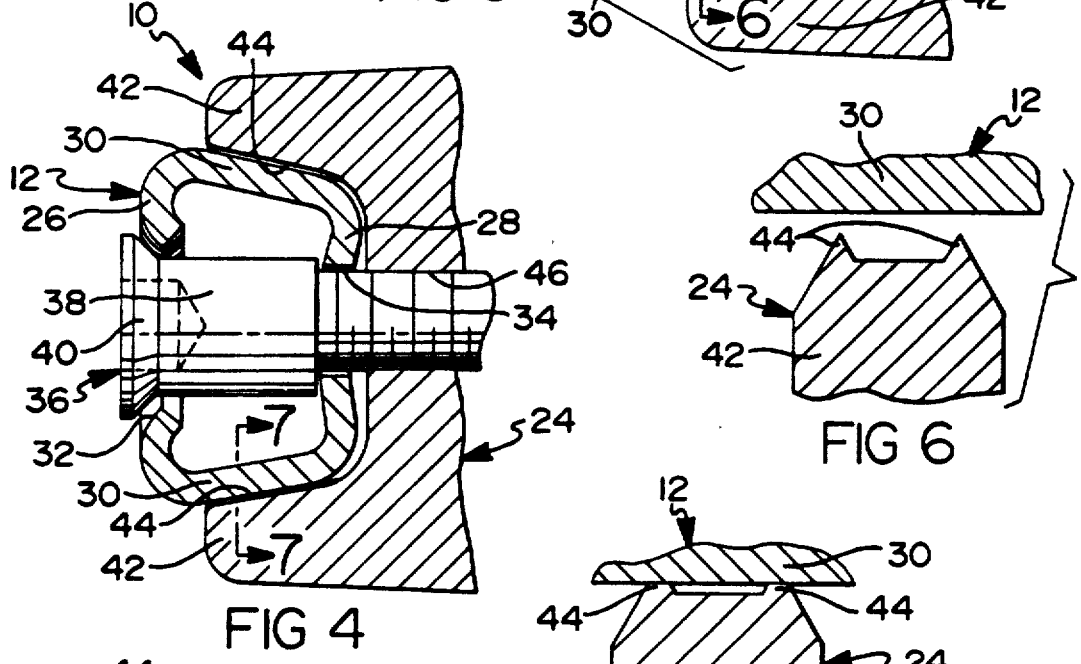
FIG. 4 is a view like FIG. 5, but showing the parts in the process of being mounted.

Referring next to FIGS. 2 and 3, a part of frame tube 12 is formed into a mounting portion that has a generally trapezoidal cross section, as measured perpendicularly to the axis of tube 12. The cross section is comprised of a top wall 26, a generally parallel bottom wall 28, and inwardly tapered side walls 30. The side walls 30 are basically flat, while bottom wall 28 is sprung up slightly, in its free state, so as to be spaced a distance D from top wall 26. At two axially spaced locations, the top and bottom walls 26 and 28 are pierced by an aligned pair of bolt holes 32 and 34 respectively, the upper of which has a larger diameter and is flared inwardly. A threaded fastening bolt, indicated generally at 36, is provided for each pair of aligned holes 32 and 34. Each bolt 36 has an upper shouldered sleeve 38 that fits through top hole 32, but not through bottom hole 34, with a tapered neck 40 that fits tightly into the flared top hole 32. The length of sleeve 38, indicated at X, is slightly greater than the distance D, for a purpose described below.

Figure 6:
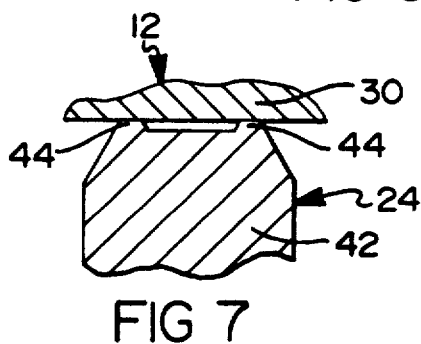
FIG. 6 is a cross sectional view taken along the line 6—6 of FIG. 3.

Referring next to FIGS. 2, 3 and 6, motor housing 24, which is die cast aluminum, has two pairs of inwardly tapered, opposed flanges 42 integrally molded therewith. The inner surfaces of the pairs of flanges 42 are spaced apart by substantially the same amount as the frame tube side walls 30, within the available manufacturing tolerances. The flanges 42, therefore, together comprise a channel portion on housing 24 that has substantially the same trapezoidal cross section as that defined by the frame tube side walls 30. Integrally molded to the inner surfaces of the opposed housing flanges 42 are localized projections comprised of parallel pairs of thin ribs 44. Ribs 44, as best shown in FIG. 6, are located near the edges of flanges 42, and are sharp edged. Given the fact that ribs 44 are thin, and integrally molded of the same, relatively softer aluminum, they are deformable if contacted by a sufficient force. Centered between each pair of flanges 42 is a threaded socket 46 oriented generally perpendicular to the final location of the axis of frame tube 12. Motor housing 24 also has a mounting grommet 48 integrally molded to the side.

FIGS. 4 through 8 illustrate how housing 24 is mounted to frame tube 12. Each pair of bolt holes 32 and 34 is aligned with a socket 46, and a bolt 36 is inserted and tightened down. This draws the frame tube side walls 30 down between the inner surfaces of the opposed pairs of housing flanges 42, in a direction generally normal to the axis of frame tube 12. Since the tapered cross sections of side walls 30 and housing flanges 42 generally match, and since the ribs 44 extend into that cross section, the harder steel tube side walls 30 will contact the softer aluminum of the ribs 44 and shear and deform them progressively. Ribs 44 are high enough to assure that this contact will occur in spite of a worst case manufacturing tolerance variation between the tube side walls 30 and housing flanges 42, but not so large that their deformation will put excessive force on the housing flanges 42. This contact and deformation is shown occurring in FIGS. 4 and 7. Eventually, the shouldered bolt sleeve 38 hits the tube bottom wall 28 and flattens it out until bolt 36 and tube 12 are fully seated, and the connection is complete.

Figure 5:
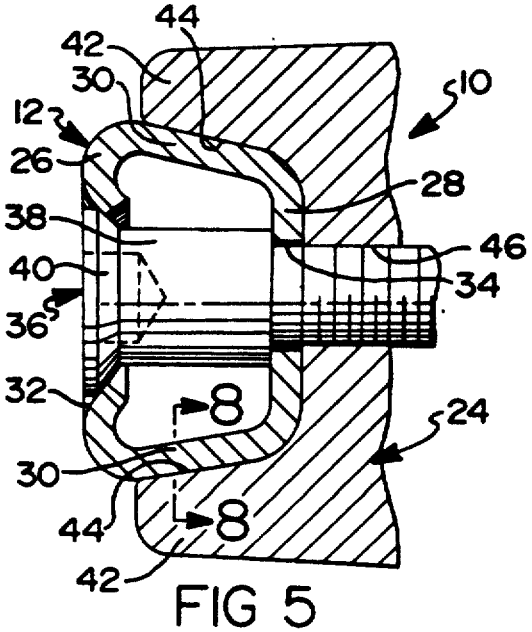
FIG. 5 is a cross sectional view taken along the line 5—5 of FIG. 2.
Figure 7:
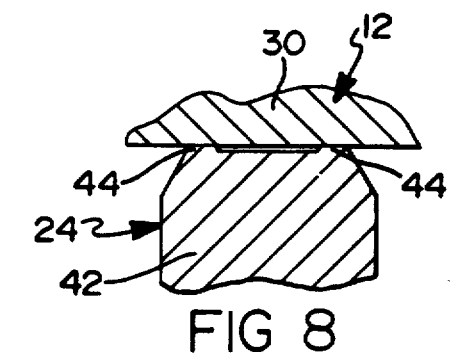
FIG. 7 is a cross sectional view taken along the line 7—7 of FIG. 4.
Figure 8:
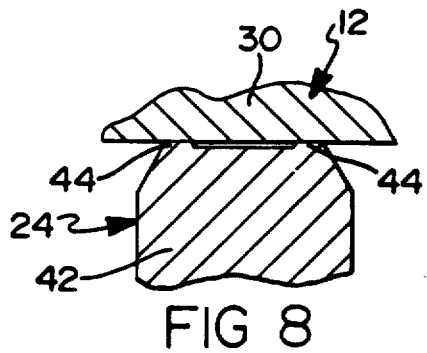
FIG. 8 is a cross sectional view taken along the line 8—8 of FIG. 5.

Referring next to FIGS. 1, 5 and 8, once housing 24 is fixed to frame tube 12, the various grommets 14, 16 and 48 are fixed to the vehicle body 18. This gives stable, three point support of the wiper system 10. More important to the invention, several mechanisms cooperate to assure that the connection of housing 24 to frame tube 12 is solid and secure. The deformation of the ribs 44 assures that there is continuous, intimate contact between the tube side walls 30 and flanges 42, much like mortar flowing out to fill the gap between bricks. The flattening of the tube bottom wall 28 by the bolt sleeve 38 assures a tensioned, rattle free seating of the bottom wall 28. In addition, as the bolt neck 40 enters top bolt hole 32 it tends to wedge the side walls 30 apart, biasing them into the flanges 42. Also, the contact between the bolt neck 40 and flared top hole 32 provides extra resistance to the tube 12 sliding axially relative to the housing 24. A secure solid connection is achieved with no extra bracketing or other fastening components between tube 12 and housing 24.

Variations in the preferred embodiment could be made. Any mounting portion on the tube 12 and channel portion on the housing with matching tapered cross sections and with localized projections extending into that cross section would assure intimate contact at the connection interface. Potentially, the tube 12 need not even be hollow, although the hollow tube 12 is an advantage in that it also allows for the bolt 36 to create the tensioned, secure contacts described above. The same system could be used to mount a different housing, such as a wiper pivot housing, to the frame tube 12. The housing could potentially be molded of any material, even a suitable plastic, that was soft enough to be deformable when molded into a thin projection. If the housing is die cast, one possibility would be to mold it so that the inevitable flashing strips that form at parting lines could serve as the deformable projections. Therefore, it will be understood that the invention is not intended to be limited to just the embodiment disclosed.

The embodiments of the invention in which an exclusive property or privilege is claimed are defined as follows:

1. A wiper system for a vehicle having a windshield, comprising, a generally axial frame tube fixed to said vehicle below said windshield, said frame tube comprising a relatively harder material and having an inwardly tapered mounting portion with a predetermined cross sectional area as measured in a plane normal to said frame tube axis, a windshield wiper motor housing comprising a relatively softer material and having an inwardly tapered channel portion with a pair of inwardly tapered side surfaces defining a cross sectional area substantially matching that of said frame tube mounting portion, said channel portion further comprising at least one localized projection extending into said matching cross sectional area, and, fastening means adapted to pull said frame tube mounting portion into said housing channel portion along a path generally normal to said tube axis, thereby causing said harder mounting portion to shear and deform said projection, by virtue of said matching tapered cross sections, until said frame tube is tightly seated, whereby, intimate contact between said mounting portion and channel portion is assured.

2. A wiper system for a vehicle having a windshield, comprising, a generally axial, hollow frame tube fixed to said vehicle below said windshield, said frame tube comprising a relatively harder material and having an upper wall and a pair of inwardly tapered side walls with a predetermined spacing, measured in a direction normal to said frame tube axis, a windshield wiper motor housing comprising a relatively softer material and having a pair of inwardly tapered, opposed flanges with a spacing substantially equal to said frame tube side walls, said flanges further including at least one thin, integrally formed rib extending therefrom, and, a fastening bolt adapted to pass through said frame tube top wall and into said housing in an orientation generally normal to said frame tube axis so as to pull said frame tube side walls between said housing flanges, thereby drawing said frame tube side walls along said housing flange ribs and shearing and deforming said ribs, by virtue of said matching spacings, until said frame tube is tightly seated, said bolt also having a wedging portion located so as to enter said frame tube top wall and bias said side walls apart and into said housing flanges, whereby, intimate, tensioned contact between said housing flanges and frame tube side walls is assured.

3. In a wiper system for a vehicle of the type having a windshield and an elongated frame tube of relatively hard metal fixed to said vehicle below said windshield and also having a windshield wiper motor housing molded from a softer material, an improved means of mounting said housing to said frame tube, comprising, an inwardly tapered mounting portion formed integrally with said frame tube having a predetermined cross sectional area as measured in a plane normal to said frame tube axis, a pair of inwardly tapered, opposed flanges molded integrally to said housing and defining a cross sectional area substantially matching that of said frame tube mounting portion, said flanges further being molded so as to have a pair of thin, integrally formed ribs extending therefrom extending into said cross sectional area, and, fastening means adapted to pull said frame tube mounting portion between said housing flanges along a path generally normal to said tube axis, thereby causing said harder mounting portion to shear and deform said pairs of ribs, by virtue of said matching tapered cross sections, until said frame tube is tightly seated, whereby, intimate contact between said frame tube mounting portion and housing flanges is assured.

* * * * *